United States Patent [19]

Hesse

[11] Patent Number: 4,712,469
[45] Date of Patent: Dec. 15, 1987

[54] CHAIN TENSIONING DEVICE

[75] Inventor: Hans Hesse, Munich, Fed. Rep. of Germany

[73] Assignee: Krauss-Maffei A.G., Fed. Rep. of Germany

[21] Appl. No.: 662,637

[22] Filed: Oct. 19, 1984

[30] Foreign Application Priority Data

Oct. 21, 1983 [DE] Fed. Rep. of Germany ....... 3338313

[51] Int. Cl.⁴ ............................................. B62D 55/30
[52] U.S. Cl. ........................................ 91/422; 403/31; 403/32
[58] Field of Search ................... 305/10, 22, 31, 32; 91/422

[56] References Cited

U.S. PATENT DOCUMENTS

| | | |
|---|---|---|
| 2,561,901 | 7/1951 | Bachman et al. . |
| 2,843,431 | 7/1958 | Beaufort . |
| 3,409,335 | 11/1968 | Piepho et al. ............... 305/10 |
| 3,539,229 | 11/1970 | Scully ........................ 305/10 |
| 3,645,586 | 2/1972 | Piepho ....................... 305/10 |
| 3,733,107 | 5/1973 | Cote et al. ................. 305/10 |
| 4,279,318 | 7/1981 | Meisel, Jr. . |
| 4,323,282 | 4/1982 | Muramoto et al. . |
| 4,323,283 | 4/1982 | Muramoto et al. . |

FOREIGN PATENT DOCUMENTS

| | | |
|---|---|---|
| 981731 | 1/1976 | Canada ....................... 305/31 |
| 1808528 | 6/1970 | Fed. Rep. of Germany . |
| 2030019 | 12/1971 | Fed. Rep. of Germany . |
| 2358386 | 6/1975 | Fed. Rep. of Germany . |
| 2539020 | 4/1976 | Fed. Rep. of Germany . |
| 2909346 | 9/1979 | Fed. Rep. of Germany . |
| 3044616 | 6/1982 | Fed. Rep. of Germany . |
| 3106516 | 9/1982 | Fed. Rep. of Germany ........ 305/31 |
| 1012327 | 7/1952 | France . |

Primary Examiner—Carlton R. Croyle
Assistant Examiner—T. Olds
Attorney, Agent, or Firm—Robert J. Koch

[57] ABSTRACT

A hydraulic tensioning device for tracked vehicles comprising a hydraulically chargeable piston-cylinder unit, coupled on one end with the body of the vehicle, and with the other end to a guide wheel for the track chain which is supported on a rocker arm. In order to obtain the proper track chain tension in any operating condition without providing a separate hydraulic pump, the piston unit is equipped with a tappet supported against the piston unit by means of a spring unit. The tappet closes off a secondary cylinder chamber in the piston unit which is connected with the principal cylinder chamber by two check valves which seal in opposite directions. The tappet effects a pumping action as the result of the vibration generated by the chain links running in and out the guide wheel, thereby pumping the hydraulic oil from a hydraulic oil reservoir into the secondary cylinder chamber and from there into the principal cylinder chamber.

20 Claims, 2 Drawing Figures

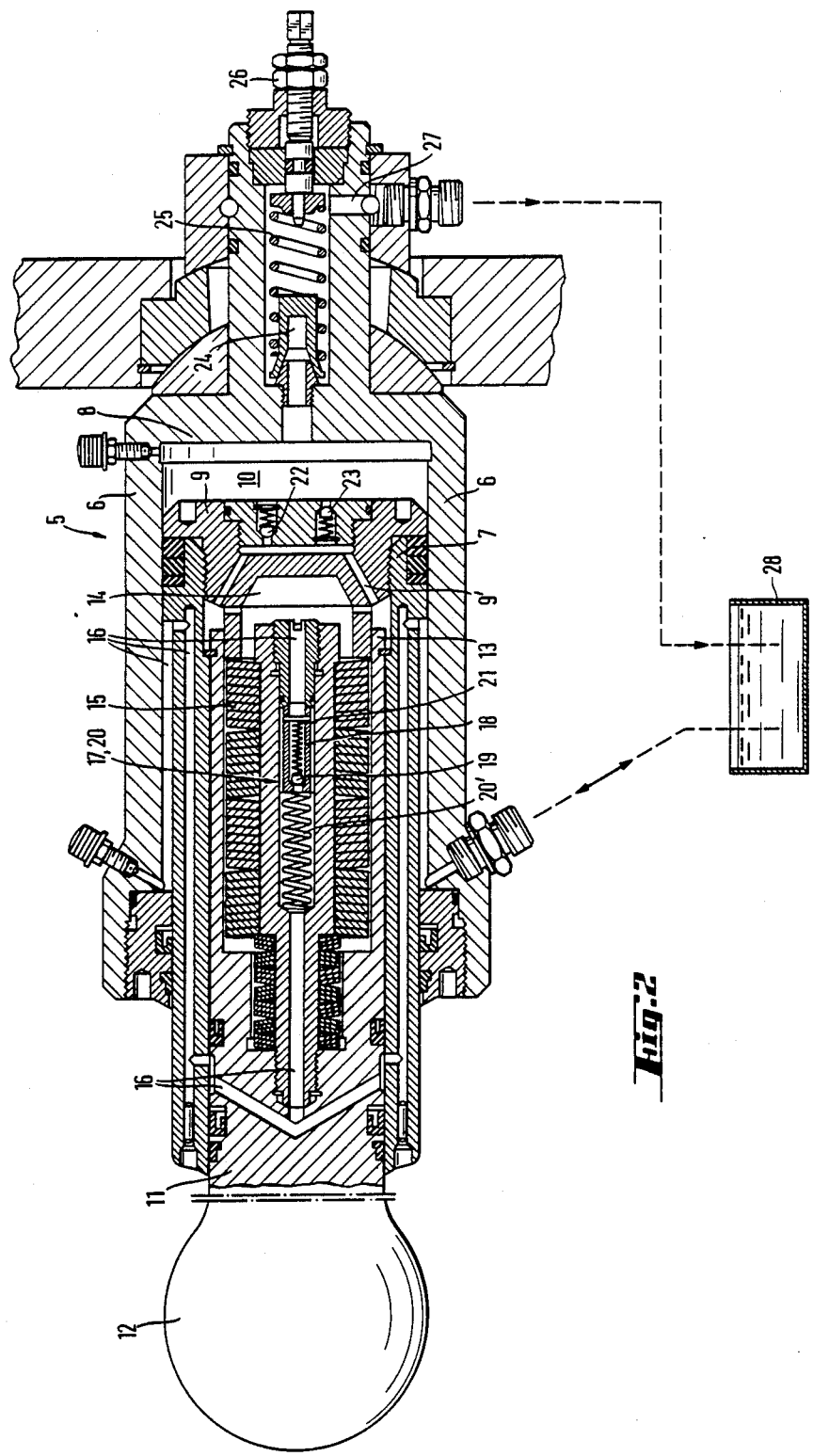

CHAIN TENSIONING DEVICE

BACKGROUND OF THE INVENTION

Field of the Invention

The invention relates to a hydraulic chain tensioning device for tracked vehicles.

A chain tensioning device of this type is known from West German Offenlezungesschrift 30 44 616, wherein the tensioning of the chain-track is effected by means of piston-cylinder unit which admits a pressured medium. However, in this chain tensioning device the pressure and the volume of the liquid pressure medium must be constantly monitored for potential leakage losses, a time consuming requirement. Furthermore, a hydraulic pump must be installed for the generation of pressure.

SUMMARY OF THE INVENTION

The object of the invention, on the other hand, is providing a chain tensioning device in which the correct chain tension is automatically established in any operating condition without the need for a separate hydraulic pump.

This object is achieved by the chain tensioning device according to the invention. The invention utilizes the characteristic of tracked vehicles that the chain links travelling in and out of the guide wheel in a moving vehicle produce vibrations which are transmitted to the support of the guide wheel with respect to the body of the vehicle and the chain tensioning device located between the guide wheel and the trough of the vehicle irrespectively. According to the invention, the energy released by the vibration is utilized to generate pressure for the hydraulic piston-cylinder unit.

Preferably, a bypass circumventing the check valve is arranged in the through line, said bypass being equipped with a pressure relief valve limiting the pressure in the secondary cylinder chamber. By maintaining a certain level of pressure, it may be assured that the necessary chain tension is preserved in any moving operational state.

In order to prevent damage to the guide wheel or its support on the trough of the vehicle in case of an excessive impact, it may be appropriate to provide a pressure relief valve on the cylinder unit whereby the hydraulic oil may be released from the principal cylinder chamber in case a permissible value is exceeded.

Preferably, means for adjusting the limiting pressure on the pressure relief valve are provided, so that the tension on the chain may be released at any time, as, for instance, during assembly.

In a preferred embodiment, the suspension unit has a progressive spring characteristic, whereby at the onset of the chain tensioning process, as for example, following the installation of the chain, a relatively large pump lift is effected, which then gradually declines with increasing tensioning force. This insures that the chain rapidly attains the tension necessary for trouble free driving.

Further objects, features and advantages of the present invention will become apparent from the detailed description of preferred embodiments which follows, when considered together with the attached figures of drawings.

BRIEF DESCRIPTION OF THE DRAWINGS

In the drawings:

FIG. 2 shows a section though the hydraulic tensioning device according to FIG. 1.

DETAILED DESCRIPTION OF PREFERRED EMBODIMENTS

Figure 1:
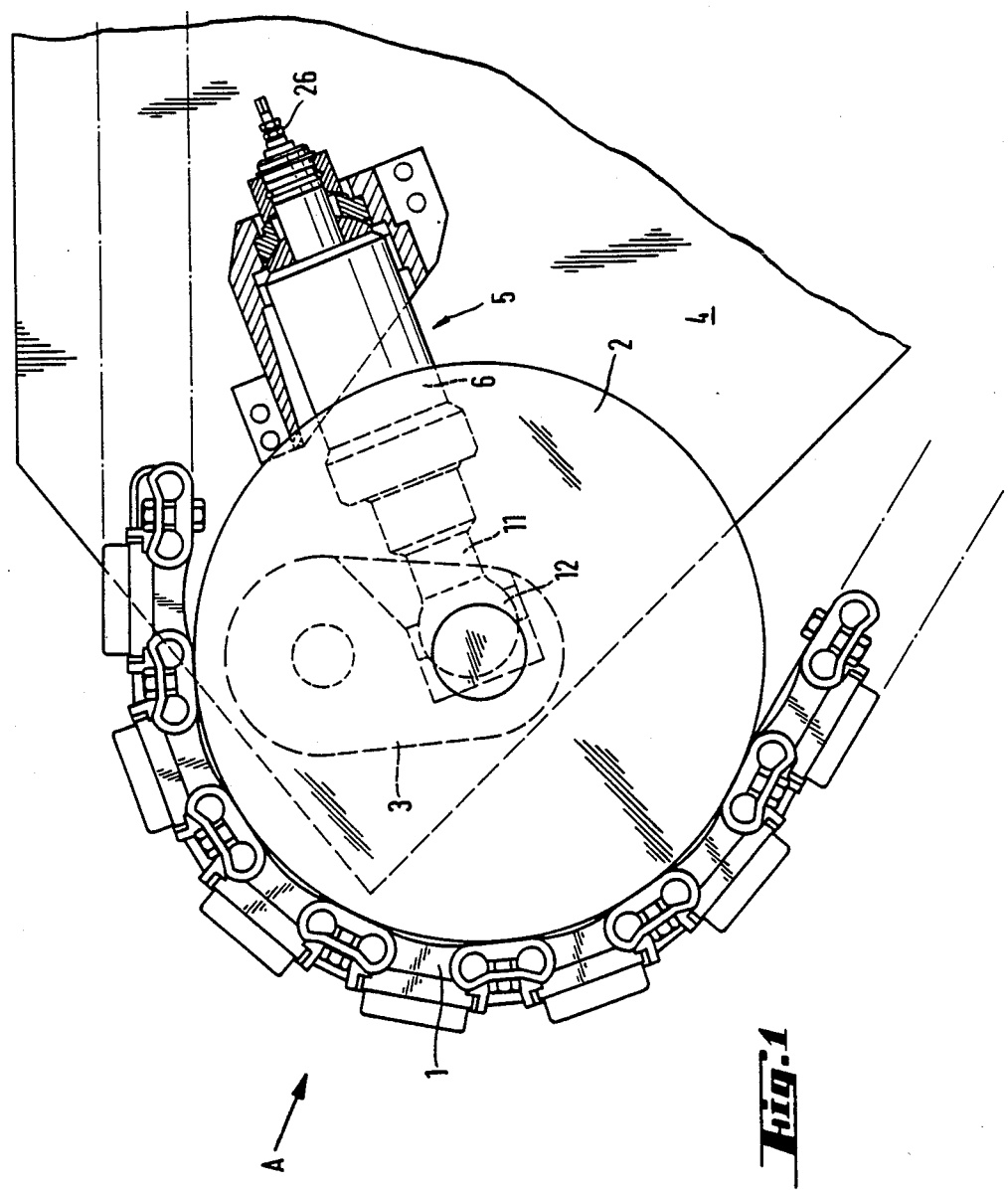
FIG. 1 shows a schematic view of a partial section of the bow area of a tracked vehicle with a guide wheel supported in the trough of the vehicle by means of a rocker arm cushioned by the action of a hydraulic tensioning device.

The partial section of a tracked vehicle running gear shows a guide wheel 2 carrying a track chain 1, and supported by means of a rocker arm 3 on the body 4 of the vehicle. A hydraulic tensioning device 5 is coupled to the rocker arm 3 and supported on the trough 4 of the vehicle by its other end.

The hydraulic tensioning device 5 shown in section in FIG. 2 consists of a cylinder 6, in which a piston unit 7 moves. The cylinder 6, its cylinder bottom 8 and the piston bottom 9 of the piston unit 7, enclose a principal cylinder chamber 10. Located in the piston unit 7 is an axially movable tappet 11, whose free end has a ball-joint piece for linking the rocker arm, and whose other end is in the form of a tappet piston 13. Said tappet piston seals an auxiliary cylinder space in the piston unit 7. The tappet piston 13 is supported on the piston unit 7 by means of a suspension unit consisting of a spring washer pack 15 with a progressive spring characteristic.

A through line 16 leads from the auxiliary cylinder space 14 through the tappet piston 13, the piston unit 7 and the cylinder 6 to a hydraulic reservoir 28, with equalizing spaces are provided at the interfaces of the tappet piston 13, the piston unit 7, and the cylinder 6 to insure an unimpaired flow in any operating position of the aforementioned functional parts. A tappet check valve 17 is located in the through line within the tappet piston 13, which checks the flow from the secondary cylinder chamber 14 in the direction of the hydraulic reservoir 28. This tappet check valve 17 consists of a valve body 18 through which the through line 16 is passes, and a sealing ball 19 which blocks the flow in one direction. The valve body 18 is also part of a pressure relief valve 20 which may be displaced against the action of a valve spring 20' in case of excess pressure in the secondary cylinder chamber 14, thereby revealing a bypass 21 which circumvents the tappet check valve 17 in the through line 16.

Two check valves 22 and 23 are arranged in the piston base 9 of the piston unit 7 with their closing directions opposing each other.

A pressure relief valve 24, the limiting pressure of which may be adjusted by means of an adjusting screw 26 acting on a valve spring 25, is located in the cylinder base 8, whereby the tensioning device 5 is supported on the vehicle body 4. The pressure in the principal chamber 10 may be regulated with the pressure relief valve 24 through a pressure relief line 27 leading to the hydraulic oil reservoir 28.

The vehicle is moved forward upon starting with an as yet untensioned track chain. Depending on the pitch of the chain, the track 1 runs the guide wheel 2 as a polygon and applies, in addition to the tensile forces from the upper and lower strand, an alternating load to the guide wheel 2 in the direction of the arrow "A" (FIG. 1) as a function of the chain pitch frequency.

On the spherical support of the vehicle body 4, this alternating load is supported by means of the tappet 11 through the spring washer pack 15, the piston bottom 9, the cylinder 6 and the cylinder base 8.

The spring washers of the spring washer pack 15, graduated to a limiting force of approx. 10 Mp, effect an extension of the push rod 11 during the relief of the hydraulic tensioning device 5. Thus, by means of the vacuum generated in the secondary cylinder chamber 14, the tappet check valve 17 is opened and hydraulic oil sucked in through the through line leading through the cylinder 6, the piston unit 7 and the rocker arm 3 from the oil reservoir 28. Upon renewed loading of the tappet 11, the tappet check valve 17 closes and the hydraulic oil suctioned in, is pushed through the check valve 22 located in the piston bottom 9 into the primary cylinder chamber 10; Thereafter, the piston unit 7 and the push rod 11 are moved out of the cylinder 6.

This process is repeated with the chain pitch frequency until the pressure in the secondary cylinder chamber 14 attains the opening pressure of the pressure release valve 20, at which time the valve body 18 is displaced against the force of the valve spring 20'; The bypass 21 is thus opened and the tappet check valve 17 and its sealing ball 19 are thus bypassed. The chain tensioning force is thus determined by the opening pressure of the pressure relief valve 20. Following the attainment of this opening pressure, the tappet check valve 17, acting as a tappet pump idles.

As the result of the progressive spring characteristic of the different spring washers of the spring washer pack 15, the stroke of the pump is initially relatively large and is decreases with increase in the tensioning force. Consequently, a loose chain rapidly attains the tension required for the prevailing mode of operation.

Because of the decreasing stroke length of the tappet 11 as the result of the increasing counter force during tensioning, the thermal stress on the system is minimized accordingly.

In accordance with the tensioning process described above, the chain tensioning force required for satisfactory driving operation is obtained automatically and readjusted automatically in case the chain elongates as the result of wear for example.

In addition to the accurate maintenance of the chain tension necessary for the operation of the vehicle, the tensioning device performs the following functions:

1. Prevention of the outward movement of the tappet 11 in case of easing the load on the track chain while the tensioning path remains correct, which may occur for example during spring deflections of the running gear.

2. Locking the tensioning force in the case of load values greater than the chain tension force, for example during braking or the movement of the vehicle in reverse.

3. Attenuation of high impact forces during the movement of the vehicle onto obstacles or contact with the guide wheel located in the bow of the vehicle.

4. Simple release of the chain during assembly work.

5. Elimination of the vibrational acceleration of the vehicle as the result of the polygon effect of the track chain.

The aforementioned functions are effected as follows:

1. When the path length of the tappet 11 appropriate for the chain tensioning force 5 required is attained, during the operation of the vehicle with the chain not under stress, a further pumping and extension, respectively, of the tensioning device is effected by the spring deflection of the track rollers, as the necessary counter force of the piston unit is missing. During the subsequent return pendulum motion of the parts of the running gear into their normal position, the chain tensioning force and thus the pressure in the primary cylinder chamber 10 rises. This higher pressure creates a difference in pressure with respect to the maximum pressure in the secondary cylinder chamber 14 limited by the pressure relief valve 20. This pressure difference causes the check valve 23 in the piston bottom 9 to open and reduces the prevailing excessive chain tensioning force by the opening of the pressure relief valve 20 in the piston bottom 9, thereby returning the excess volume of oil through the bypass 21 and the through line 16 to the hydraulic oil reservoir 28. Upon reaching the predetermined chain tensioning pressure the system is again in a stable state.

2. During the forward motion of a rear drive tracked vehicle the guide wheels themselves are largely relieved of the static chain tensile forces. This effect is reversed in reverse motion or during braking, so that the chain adjuster must support a force that is a multiple of the chain tensioning force normally required.

Should such a case occur, the entire oil volume would be removed through the check valve 23 and the pressure relief valve 20 according to the functional operation described in connection with Point 1.

To avoid the occurrence of such a process, the piston bottom 9 is provided with inlet boreholes 9', which connect the two check valves 22 and 23 with the secondary cylinder chamber 14. If a force of the aforedescribed type (reverse motion; braking) is to be supported by means of the tensioning device 5 and this force is larger than the spring force of the spring washer pack 15, the tappet piston 13 comes to rest against the orifices of the inlet boreholes 9', the oil remains locked in the primary cylinder chamber 10 and the shortening of the tensioning device is prevented.

3. In encounters with obstacles and the setting down of the guide wheels in the case of large pitching movements of the vehicle, rigid chain tensioning systems transmit very high impact forces to the vehicle, which eventually may lead to the destruction of the guide wheels, their suspension and to injuries to the crew.

To provide a reliable attenuation of such impacts, pressure relief valve 24 is located in the cylinder base 8, which opens in the case of compression values in excess of maximum operating values, thereby providing an attenuation path for the tensioning device 5. Following the damping of an impact, the tensioning device automatically resets itself.

4. To release the track chain 1 for assembly purposes, the pressure relief valve 24 may be released by means of the adjusting screws 26. As in the case of protection against excessive impacts, the oil flows back into the hydraulic oil reservoir 28.

The vibrational acceleration resulting from the polygon effect of the track chain 1 running in and out of the guide wheel 2 is stayed by the spring washer pack 15 and attenuated.

What is claimed is:

1. A hydraulic tensioning device comprising:
cylinder means for housing;
means, associated with said cylinder means, for fixing said cylinder means;
tappet means for coupling said tensioning device to an apparatus to be tensioned;
means for translating vibrational forces transmitted to said tappet means into a tensioning force tending to extend said tappet means, located within said means for housing: including
a piston assembly arranged within said cylinder exhibiting a piston base defining a primary cylinder chamber;
a tappet piston arranged within said piston assembly and defining an auxiliary cylinder chamber; means for drawing hydraulic fluid into said auxiliary cylinder chamber and pumping said hydraulic fluid into said primary cylinder chamber upon reciprocation of said tappet piston, located within said piston assembly; and means for limiting said tensioning force by idling said means for drawing, upon attainment of a predetermined pressure in said auxiliary cylinder chamber.

2. A hydraulic tensioning device according to claim 1, further comprising means for relieving an excessive pressure gradient in said primary cylinder chamber over said auxiliary cylinder chamber disposed between said primary and auxiliary cylinder chambers.

3. A hydraulic tensioning device according to claim 1, further comprising means for blocking communication between said auxiliary cylinder chamber and said primary cylinder chamber upon exertion of compressive forces exceeding a predetermined value on said tensioning device.

4. A hydraulic tensioning device according to claim 1, further comprising means for attenuating high impact forces against said tensioning device where said means for attenuating is a means for relieving pressure in said primary cylinder chamber above a predetermined pressure.

5. A hydraulic tensioning device according to claim 4, wherein said means for relieving pressure further comprises means for adjusting said predetermined pressure.

6. A hydraulic tensioning device according to claim 1, wherein said means for drawing comprises:
means for elastically biasing said tappet piston against said piston assembly;
first check valve means, located in a fluid line in said tappet piston, for admitting fluid into said auxiliary cylinder chamber and preventing egress thereof;
second check valve means disposed between said primary cylinder chamber and said auxiliary cylinder chamber, for allowing flow from said auxiliary cylinder chamber to said primary cylinder chamber.

7. A hydraulic tensioning device according to claim 6, further comprising means for bypassing said first check valve upon attainment of a predetermined auxiliary cylinder chamber pressure, located in said fluid line.

8. A hydraulic tensioning device according to claim 7, wherein said means for elastically biasing is a spring washer pack.

9. A hydraulic tensioning device according to claim 7, wherein said means for elastically biasing exhibits a progressive spring characteristic.

10. A hydraulic tensioning device according to claim 7, further comprising a third check valve means between said auxiliary and said primary cylinder chambers, blocking flow into said primary cylinder chamber, for equalizing and excessive pressure gradient of said primary cylinder chamber over said auxiliary cylinder chamber.

11. A hydraulic tensioning device according to claim 10, further comprising a bore between said auxiliary cylinder chamber and said primary cylinder chamber in said piston assembly; and
an extension of said tappet piston arranged to block said bore upon exertion of a force greater than an elastic force of said means for elastic biasing, against said tappet piston.

12. A hydraulic tensioning device according to claim 3, further comprising means for attenuating high impact forces wherein said means for attenuating is a primary cylinder chamber pressure relief valve mounted in said means for housing.

13. A hydraulic tensioning device according to claim 12, further comprising means for adjusting an operating pressure of said pressure relief valve.

14. A hydraulic tensioning device for tracked vehicles having a trough, guide wheel which functions as a running gear, and a rocker arm for bearingly and adjustably supporting the guide wheel, said hydraulic tensioning device comprising:
a hydraulic cylinder unit bearingly supported on the trough at one end and by the guide wheel on the other end;
a piston unit in said cylinder unit;
a cylinder chamber in said cylinder unit for filling with hydraulic fluid;
a tappet in said piston unit coupled to said guide wheel;
means for pumping hydraulic fluid into said cylinder chamber within said hydraulic cylinder unit including:
a tappet piston on the end of the tappet opposite said coupled end defining a secondary cylinder chamber within said piston unit;
a spring unit for supporting the tappet against said piston unit;
a through line which passes through the tappet piston, the piston unit and the cylinder, and which connects the secondary cylinder chamber with a cylinder unit hydraulic fluid inlet;
a tappet check valve positioned in the through line which blocks flow of hydraulic fluid in the direction of the hydraulic reservoir; and
two check valves in a base of said piston arranged for connecting the cylinder chamber and the secondary cylinder chamber, which are positioned to block flow of hydraulic fluid in opposite directions.

15. A track tensioning device according to claim 14 further comprising:
a bypass which detours the tappet check valve in the through line; and
a pressure relief valve in the bypass which limits the pressure in the secondary cylinder space.

16. A track tensioning device according to claim 14 further comprising:
a pressure control valve in the cylinder base; and an excess oil line which allows excess oil to flow from the cylinder space to the hydraulic oil reservoir when predetermined permissible pressures are exceeded and the pressure control valve opens.

17. A track tensioning device according to claim 16 further comprising means for adjusting the predetermined pressure of the pressure control valve.

18. A track tensioning device according to claim 14 wherein the spring unit has a progressive spring characteristic.

19. A track tensioning device according to claim 16 wherein the spring unit is a spring washer pack.

20. a track tensioning device according to claim 14 further comprising inlet boreholes arranged in the piston base, which function to connect the two check valves with the secondary cylinder chamber, and which are sealed by motion between the piston unit and the tappet piston which exceeds the spring path of the spring unit.

* * * * *